United States Patent [19]
Fujimoto

[11] Patent Number: 5,418,913
[45] Date of Patent: May 23, 1995

[54] SYSTEM OF TWO-WAY COMMUNICATION BETWEEN PROCESSORS USING A SINGLE QUEUE PARTITIONED WITH POINTERS AND LIMITED OVERWRITE PRIVILEGES

[75] Inventor: Atsushi Fujimoto, Kawasaki, Japan
[73] Assignee: Fuji Xerox Co., Ltd., Japan
[21] Appl. No.: 265,393
[22] Filed: Jun. 24, 1994

Related U.S. Application Data

[63] Continuation of Ser. No. 703,472, May 17, 1991, abandoned.

[30] Foreign Application Priority Data

May 21, 1990 [JP] Japan .................. 2-131098

[51] Int. Cl.⁶ .................. G06F 13/00; G06F 15/163
[52] U.S. Cl. .................. 395/200; 395/600; 395/425; 364/DIG. 1; 364/229; 364/238.6; 364/239; 364/240.8; 364/244.3; 364/284; 364/284.1
[58] Field of Search .................. 395/600, 425, 200

[56] References Cited

U.S. PATENT DOCUMENTS

| | | |
|---|---|---|
| 4,449,182 | 5/1984 | Rubinson et al. |
| 4,604,500 | 8/1986 | Brown et al. .................. 379/269 |
| 4,646,294 | 2/1987 | Elisch et al. .................. 370/85.6 |
| 4,835,738 | 5/1989 | Niehaus et al. .................. 395/425 |
| 4,933,932 | 6/1990 | Quinquis et al. .................. 370/60 |
| 4,949,301 | 8/1990 | Joshi et al. .................. 395/425 |
| 4,980,852 | 12/1990 | Giroir et al. .................. 395/775 |
| 4,991,972 | 2/1991 | Ikenoue et al. |
| 5,036,459 | 7/1991 | den Haan et al. .................. 395/200 |
| 5,053,945 | 10/1991 | Whisler . |
| 5,133,062 | 7/1992 | Joshi et al. .................. 395/500 |
| 5,202,972 | 4/1993 | Ausefski et al. .................. 395/425 |
| 5,265,229 | 11/1993 | Sareen .................. 395/425 |
| 5,317,720 | 5/1994 | Stamm et al. .................. 395/425 |
| 5,333,296 | 7/1994 | Bouchard et al. .................. 395/425 |

OTHER PUBLICATIONS

Lane, Data Communications Software Design, Boyd & Fraser, 1985, Chapter 2, pp. 283–299.

*Primary Examiner*—Thomas G. Black
*Assistant Examiner*—Wayne Amsbury
*Attorney, Agent, or Firm*—Welsh & Katz, Ltd.

[57] ABSTRACT

A method of two-way communication in a multiprocessor system in which two-way data communication is effected between a first processor and a second processor via a common memory. The first processor sequentially writes data A, B, C, ..., F into the common memory, and forms a coupled queue. If the data A, B, C among the data A, B, C, ..., F in the coupled queue are sequentially read by the second processor, the coupled queue is divided into a first partial queue constituted by the data D, E, F and a second partial queue constituted by the data A, B, C. The second processor is capable of sequentially reading the data D, E, F from the first partial queue, while the first processor is capable of sequentially reading the data A, B, C from the second partial queue. When the second processor sequentially reads the data A, B, C, ..., F and the first processor then sequentially reads the data A, B, C, ..., F in the above-described manner, it follows that the data A, B, C ..., F are transmitted from the first processor to the second processor and are then returned from the second processor to the first processor. Two-way communication is thus established between the first and second processors.

19 Claims, 9 Drawing Sheets

QUEUE MANAGEMENT TABLE

| QUEUE #1 | QUEUE #2 | --- | QUEUE #n |
|---|---|---|---|
| NO. OF COUPLINGS OF QUEUE=m1 | NO. OF COUPLINGS OF QUEUE=m2 | --- | NO. OF COUPLINGS OF QUEUE=mn |
| RECEIVER'S IDENTIFIER $S_1$ | RECEIVER'S IDENTIFIER $S_1$ | --- | RECEIVER'S IDENTIFIER $S_1$ |
| RECEIVER'S IDENTIFIER $S_2$ | RECEIVER'S IDENTIFIER $S_2$ | --- | RECEIVER'S IDENTIFIER $S_2$ |
| ⋮ | ⋮ | --- | ⋮ |
| RECEIVER'S IDENTIFIER $S_{m1}$ | RECEIVER'S IDENTIFIER $S_{m2}$ | --- | RECEIVER'S IDENTIFIER $S_{mn}$ |
| QUEUE START ADDRESS | QUEUE START ADDRESS | --- | QUEUE START ADDRESS |
| QUEUE END ADDRESS | QUEUE END ADDRESS | --- | QUEUE END ADDRESS |
| WRITE POINTER | WRITE POINTER | --- | WRITE POINTER |
| READ/WRITE POINTER $R_1$ | READ/WRITE POINTER $R_1$ | --- | READ/WRITE POINTER $R_1$ |
| READ/WRITE POINTER $R_2$ | READ/WRITE POINTER $R_2$ | --- | READ/WRITE POINTER $R_2$ |
| ⋮ | ⋮ | --- | ⋮ |
| READ/WRITE POINTER $R_{m1-1}$ | READ/WRITE POINTER $R_{m2-1}$ | --- | READ/WRITE POINTER $R_{mn-1}$ |
| READ POINTER $R_{m1}$ | READ POINTER $R_{m2}$ | --- | READ POINTER $R_{mn}$ |

FIG. 4

POINTER TABLE

| PROCESSOR #P1 | PROCESSOR #P2 | --- | PROCESSOR #Pn |
|---|---|---|---|
| POINTER TO QUEUE MANAGEMENT TABLE | POINTER TO QUEUE MANAGEMENT TABLE | --- | POINTER TO QUEUE MANAGEMENT TABLE |
| NO. OF QUEUES | NO. OF QUEUES | --- | NO. OF QUEUES |

FIG. 5

SYSTEM OF TWO-WAY COMMUNICATION BETWEEN PROCESSORS USING A SINGLE QUEUE PARTITIONED WITH POINTERS AND LIMITED OVERWRITE PRIVILEGES

This is a continuation of application Ser. No. 07/703,472, filed May 17, 1991, now abandoned.

BACKGROUND OF THE INVENTION

Field of the Invention

The present invention relates to a multiprocessor system having a plurality of processors and a common memory used in common by the processors, and more particularly to a method of two-way communication in a multiprocessor system for mutually exchanging messages among processors through a common memory.

Description of the Related Art

FIG. 9 is a diagram schematically illustrating an example of a multiprocessor system. In the drawing, a plurality of processors 112 and a main common memory 113 are connected to a system bus 111, and each of the processors 112 has a central processor (CPU) 114 and a local memory 115. The main common memory 113 is used in common by the processors 112, and is accessed by the processors 112 via the system bus 111.

FIG. 10 is a diagram schematically illustrating another example of the multiprocessor system, in which each of the processors 112 is provided with a sub common memory 116. In this case, since each of the processors 112 is capable of accessing its own sub common memory 116 without via the system bus 111, high-speed processing becomes possible. It goes without saying that each of the processors 112 is capable of accessing the main common memory 113 via the system bus 111 and mutually accessing the sub common memory 116 belonging to another processor 112.

Here, if a comparison is made between the multiprocessor systems of the above-described two examples, although there is a difference in that in the latter example each of the processors 112 has the sub common memory 116 assigned thereto, the logical configurations of the two examples are equivalent since each of the sub common memories 116 is accessed by each processor 112 in the same way as the main common memory 113 is accessed.

When communication is effected between two processors in such a multiprocessor system, a common memory is used.

For example, when data communication is effected from a first processor 121 to a second processor 122, as shown in FIG. 11, the first processor 121 writes data to be communicated into a buffer 124 located in a common memory 123, and sets a flag 125 in the common memory 123 so as to indicate that the data has been written into the buffer 124. When the flag 125 is set, the second processor 122 reads the data from the buffer 124 and resets the flag 125. Accordingly, each time the data is transmitted from the first processor 121 to the second processor 122, the setting and resetting of the flag 125 are repeated. However, in the case where data communication between processors is effected by using the flag in the above-described manner, both processors must periodically monitor the flag in the common memory, so that the efficiency is poor.

Accordingly, there is an alternative method in which an interruption is generated instead of using the flag. In other words, when the first processor writes data into the buffer, an interruption from the first processor to the second processor is generated, and the second processor reads the data from the buffer in response to this interruption. However, since an interruption must be generated each time data is transmitted, the efficiency is not improved by a substantial degree.

Thus, in a conventional multiprocessor system, each time communication is effected wherein one of two processors writes data into the buffer located in the common memory and the other reads the data from the buffer, it is necessary to either set/reset the flag or generate an interruption. For this reason, there has been a problem in that data communication cannot be effected with high efficiency.

In addition, if an attempt is made to conduct data communication reciprocally among a plurality of processors by using the above-described data communication system, it has been difficult to systematically manage the two-way communication since data communication is independent for each one-way communication between two processors.

SUMMARY OF THE INVENTION

Accordingly, it is an object of the present invention to provide a method of two-way communication in a multiprocessor system which is capable of effecting data communication efficiently among a plurality of processors.

To this end, in accordance with one aspect of the invention, there is provided a method of two-way communication in a multiprocessor system having a plurality of processors and a common memory used in common by the processors, comprising the steps of: forming in the common memory a coupled data queue in which a plurality of partial data queues are coupled; providing each of the partial data queues with a write pointer which indicates a writing position of data and which is advanced by one position each time the data is written and a read pointer which indicates a reading position of the data and which is advanced by one position by following the write pointer each time the data is read; using both the read pointer of one partial data queue of the partial data queues and the write pointer of an ensuing partial data queue so as to form the coupled data queue; and assigning to each of the processors the read pointer and the write pointer so as to allow each of the processors to read the data from the reading position of the coupled data queue indicated by the read pointer given, and to write the data at the writing position of the coupled data queue indicated by the write pointer given.

In accordance with this aspect of the invention, since both the read pointer of a partial data queue and the write pointer of an ensuing partial data queue in the coupled data queue are used for coupling the coupled data queue, the read pointer and the write pointer are concurrently accessed and are advanced by one position, respectively. If, for instance, the first processor accesses the write pointer of the former partial data queue and writes data, the second processor is capable of reading the data from the read pointer of this partial data queue. At this juncture, since the write pointer of an ensuing partial data queue is advanced as a result of advancement of the read pointer, the data is delivered from the former partial data queue to the latter partial data queue. Subsequently, if the first processor reads the data from the read pointer of the latter partial data queue, it follows that the data has reciprocated between the first and second processors, so that two-way communication is established between the first and second processors.

In addition, in accordance with another aspect of the invention, the data queue is formed in the common memory, each of the processors is provided with at least one data queue, a management table for managing the data queue provided to each of the processors is formed in the common memory for each of the processors, and at least the read pointer and the write pointer of the data queue subject to management, and an identifier indicating a receiving side waiting for reading the data from the read pointer of the data queue are registered in the management table.

In accordance with this aspect of the invention, a plurality of processors respectively possess at least one data queue, and these data queues are managed on the basis of the management tables provided for the respective processors. These management tables are stored in the common memory, and registered in them are the read pointer and the write pointer of the data queue subject to management, and an identifier indicating a receiving side waiting for reading the data from the read pointer of the data queue. Consequently, the processor is capable of accessing the data queues possessed by the other processors on the basis of the management tables of the other processors.

BRIEF DESCRIPTION OF THE DRAWINGS

FIG. 4 is a diagram illustrating a queue management table in accordance with the embodiment;

FIG. 5 is a diagram illustrating a pointer table in accordance with the embodiment;

DESCRIPTION OF THE PREFERRED EMBODIMENT

Figure 1:
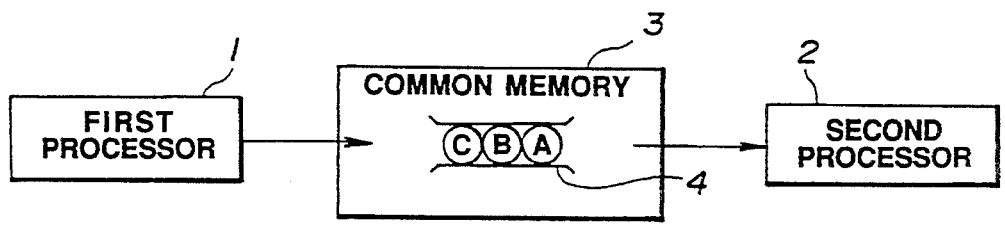
FIGS. 1(a) to 1(c) are diagrams illustrating a basic principle of a method of two-way communication in a multiprocessor system in accordance with the present invention.
Figure 1:
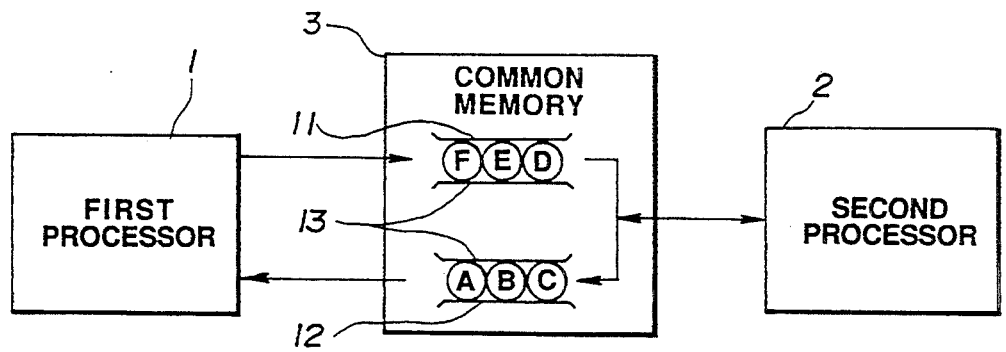
Figure 1:
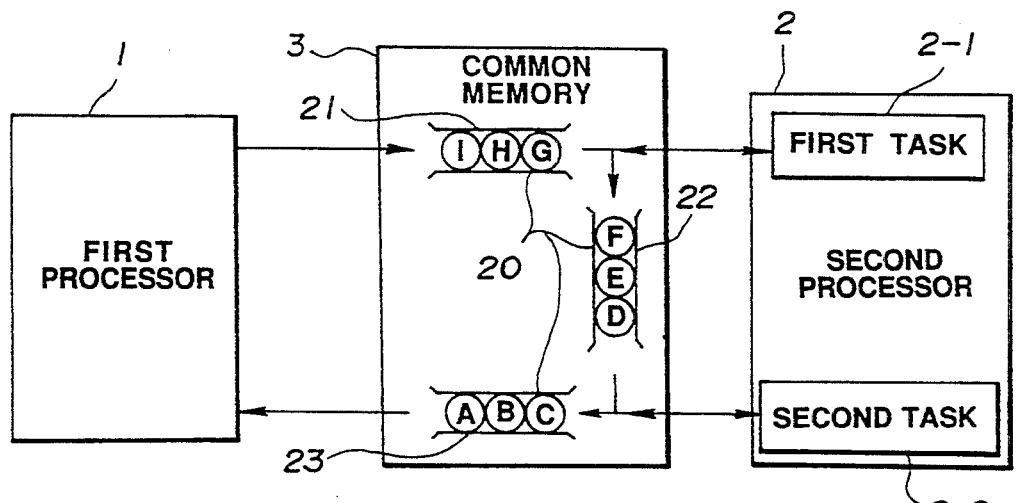

Referring first to FIGS. 1(a) to 1(c), a description will be given sequentially of a basic principle of a method of two-way communication in a multiprocessor system in accordance with the present invention.

FIG. 1(a) is a diagram illustrating one-way communication from one processor to another which is effected by making use of a data queue. In this drawing, a first processor 1 sequentially writes respective data A, B, and C to be transmitted to a second processor 2 into a common memory 3, thereby forming a data queue (hereinafter referred to as the queue) 4. At this stage, if an interruption from the first processor 1 to the second processor 2 is effected, the second processor 2 sequentially reads the respective data A, B, and C from the queue 4. Accordingly, if this queue 4 is formed in the common memory 3, it is possible to transmit a plurality of data from the first processor 1 to the second processor 2 by a single interruption. It should be noted that a technique concerning such one-way communication is disclosed in Japanese Patent Application No. 61735/1989 filed by the present applicant on Mar. 14, 1989.

However, although the use of the queue 4 makes it unnecessary to generate an interruption on each occasion of transmission of an item of data, only one-way data communication can be effected from the first processor 1 to the second processor 2. In order to conduct data communication in an opposite direction, it is necessary to form another queue in the common memory 3. Consequently, if data communication is assumed to be effected among a multiplicity of processors, the number of queues becomes very large.

Accordingly, in the method of two-way communication in accordance with the present invention, a coupled queue 13 comprising a first partial queue 11 and a second partial queue 12 is formed in the common memory 3, as shown in FIG. 1(b). The arrangement provided in this method is such that data transmission from the first processor 1 to the second processor 2 is effected via the first partial queue 11, while data transmission from the second processor 2 to the first processor 1 is effected via the second partial queue 12. That is, the first processor 1 sequentially writes the respective data A, B . . . , F into the common memory 3, thereby forming the coupled queue 13. Then, when an interruption from the first processor 1 to the second processor 2 is executed, the second processor 2 sequentially reads the respective data A, B, . . . from the coupled queue 13. Here, if it is assumed that, for instance, the Second processor 2 has sequentially read A, B, C among the respective data A, B . . . , F, the coupled queue 13 is divided into the first partial queue 11 constituted by the data D, E, F and the second partial queue 12 constituted by the data A, B, C. That is, the second partial queue 12 is formed such that it is constituted by the respective data read from the coupled queue 13 by the second processor 2, and that data are imparted thereto from the first partial queue 11. When an interruption from the second processor 2 to the first processor 1 is executed, the data A, B, C forming the second partial queue 12 are sequentially read by the first processor 1. Thus, when the coupled queue 13 comprising the first partial queue 11 and the second partial queue 12 is formed, after data are transmitted from the first processor 1 to the second processor 2, the data are returned from the second processor 2 to the first processor 1. Accordingly, by forming only one coupled queue 13 in the common memory 3, two-way communication between the first processor 1 and the second processor 2 becomes possible. Moreover, the first processor 1 is capable of monitoring the state of data transmission to the second processor 2 as the first processor 1 discriminates a dividing position between the first partial queue 11 and the second partial queue 12.

It should be noted that although in the above-described example the second processor 2, after receiving the data A, B, ..., F via the first partial queue 11, returns the data as they are to the first processor 1 via the second partial queue 12 without processing them, the second processor 2 may return the data after updating them. In this case, the second processor 2 processes the data A, B, ..., F received, and returns resultant data A', B', ..., F' to the first processor 1 via the second partial queue 12.

FIG. 1(c) shows a coupled queue 20 divided into three partial queues, and this coupled queue 20 comprises a first partial queue 21, a second partial queue 22, and a third partial queue 23. In this case, data transmission from the first processor 1 to the second processor 2 is effected by the first partial queue 21, data transmission from a first task 2-1 to a second task 2-2 in the second processor 2 is effected via the second partial queue 22, and data transmission from the second processor 2 to the first processor 1 is effected via the third partial queue 23. That is, the first processor 1 sequentially writes the data A, B ..., I into the common memory 3, thereby forming the coupled queue 20. Then, when an interruption from the first processor 1 to the first task 2-1 in the second processor 2 is executed, the first task 2-1 in the second processor 2 sequentially reads the data A, B, ... from the coupled queue 20. Subsequently, when an interruption from the first task 2-1 to the second task 2-2 in the second processor 2 is executed, the second task 2-2 in the second processor 2 sequentially reads the data A, B ... from the coupled queue 20. Here, if it is assumed that, for instance, the first task 2-1 in the second processor 2 has sequentially read A, B ..., F among the data A, B ..., I, and that the second task 2-2 in the second processor 2 has sequentially read A, B, C among the data A, B, ..., I, then the coupled queue 20 is divided into the first partial queue 21 constituted by the data G, H, I, the second partial queue 22 constituted by the data D, E, F, and the third partial queue 23 constituted by the data A, B, C. That is, the second partial queue 22 is formed such that it is constituted by the respective data read from the coupled queue 20 by the first task 2-1 in the second processor 2, and that data are imparted from the first partial queue 21 to the second partial queue 22. In addition, the third partial queue 23 is formed such that it is constituted by the respective data read by the second task 2-2 from the second partial queue 22 formed by the first task 2-1 in the second processor 2, and that data are imparted from the second partial queue 22 to the third partial queue 23. Then, the data A, B, C forming this third partial queue 23 are sequentially read by the first processor 1. Thus, in the case where the coupled queue 20 comprising the three partial queues is formed, after data are transmitted from the first processor 1 to the second processor 2, the data are sequentially read by the first task 2-1 and the second task 2-2 in the second processor 2, and the data are returned from the second processor 2 to the first processor 1. Accordingly, two-way communication between the first processor 1 and the second processor 2 becomes possible, and it also becomes possible to sequentially impart data to the first task 2-1 and the second task 2-2 in the second processor 2. Moreover, the first processor 1 is capable of monitoring the state of data processing by the first task 2-1 in the second processor 2 as the first processor 1 discriminates a dividing position between the first partial queue 21 and the second partial queue 22. Similarly, the first processor 1 is capable of monitoring the state of data processing by the second task 2-2 in the second processor 2 as the first processor 1 discriminates a dividing position between the second partial queue 22 and the third partial queue 23.

It should be noted that although in the above-described example the data A, B ..., I are not updated by the first task 2-1 and the second task 2-2 in the second processor 2, it goes without saying that processing of these data may be effected. For example, the first task 2-1 in the second processor 2 processes the data A, B, ..., I received from the first processor 1 via the first partial queue 21, and transmits resultant data A', B', ..., I' to the second task 2-2 via the second partial queue 22. The second task 2-2 processes the data A', B', ..., I' received from the first task 2-1, and returns resultant data A", B", ..., I" to the first processor 1 via the third partial queue 23. In this case, the first processor 1 is capable of obtaining the data A", B", ..., I" by outputting the data A, B, ..., I.

In addition, although the first and second tasks in the first and second processors have been illustrated in the above, the first, second, and third processors may be used instead of these tasks. In this case, the data written into the coupled queue from the first processor are consecutively read by the second processor, the third processor, and the first processor in that order.

If a coupled queue comprising two or more partial queues is formed in this manner, each time data are imparted from one partial queue to another, the data are imparted from one processor to another, so that two-way communication among a plurality of processors becomes possible. In this case, an arrangement may be provided such that after a plurality of data are written into a partial queue, an interruption to the processor or task being communicated with is generated. Alternatively, each time data is written into the partial queue, a determination may be made as to whether or not the partial queue was empty immediately before that writing, and an interruption to the counterpart of communication may be generated only when the partial queue was empty. In the latter case, if the partial queue was not empty immediately before writing, it is assumed that the counterpart of communication is still continuing the reading of data from that partial queue, so that there is no need to newly generate an interruption.

Next, a description will be given of the structures of the respective queues shown in FIGS. 1(a) to 1(c).

Figure 2A:
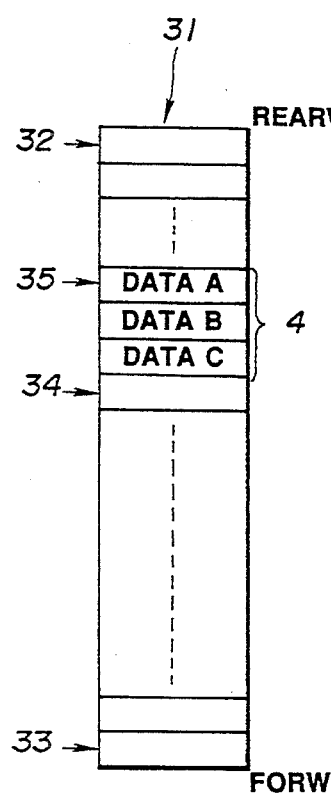
FIGS. 2(a) to 2(c) are diagrams illustrating a queue for one-way communication and two coupled queues for two-way communication in accordance with an embodiment of the present invention.

The queue 4 for one-way communication shown in FIG. 1(a) is formed with reference to a table such as the one shown in FIG. 2(a). This table has a queue area 31 for consecutively storing a plurality of data, a queue start address 32 indicating the starting position of the queue area 31, a queue end address 33 indicating the ending position of the queue area 31, a write pointer 34 indicating a position of data writing, and a read pointer 35 indicating a position of data reading. The write pointer 34 is advanced by one position each time data is written at the position of the write pointer 34 by the first processor 1. When the write pointer reaches the queue end address 33 and data is written at it, the write pointer 34 returns to the queue start address 32. The read pointer 35 is advanced by one position each time the data is read from the position of the read pointer 35 by the second processor 2. The essential characteristic of the read pointer 35 is such that it follows the write pointer 34 and cannot outstrip the write pointer 34. Here, an area ranging from a position immediately following the write pointer 34 to the read pointer 35 Constitutes the queue 4.

It should be noted that in a case where the position indicated by the write pointer 34 and the position indicated by the read pointer 35 are identical, no data has been written into the queue area 31, i.e., the queue area 31 is empty. If the position indicated by the read pointer 35 immediately precedes the position indicated by the write pointer 34, new data cannot be written into the queue area 31, i.e., the queue area 31 is full.

Figure 2B:
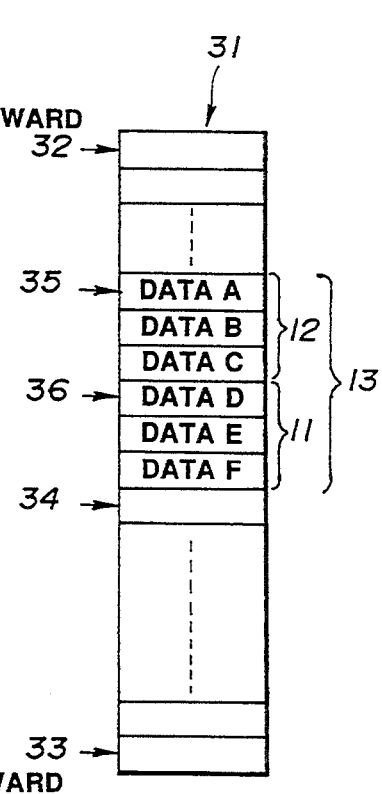

FIG. 2(b) shows a table for forming the coupled queue 13 shown in FIG. 1(b) for implementing the method of two-way communication in accordance with the present invention. In this table, a read/write pointer 36 is provided between the write pointer 34 and the read pointer 35 in the table shown in FIG. 2(a). It should be noted that, in FIG. 2(b), those positions that function in the same way as those in FIG. 2(a) are denoted by the same reference numerals for the sake of convenience.

Here, the write pointer 34 and the read pointer 35 indicate the respective positions where the writing and reading of data by the first processor 1 are effected. The write pointer 34 and the read pointer 35 are respectively advanced by one position each time the writing and reading of data are effected.

In addition, the read/write pointer 36 indicates the position where the reading and writing of data by the second processor 2 are effected. When the data is read from this position, the read/write pointer 36 is advanced by one position, and at this time the updating of data by writing can also be effected. However, the read/write pointer 36 does not outstrip the write pointer 34, nor is it outstripped by the read pointer 35.

An area ranging from a position immediately following the write pointer 34 to the read/write pointer 36 corresponds to the first partial queue 11, while an area ranging from a position immediately following the read/write pointer 36 to the read pointer 35 corresponds to the second partial queue 12.

The coupled queue 13 is formed by coupling the first partial queue 11 and the second partial queue 12. Meanwhile, the read/write pointer 36 also serves as the data-reading position (read pointer) located on the rear side of the first partial queue 11 as well as the data-writing position (write pointer) located on the forward side of the second partial queue 12.

Here, if the reading of data by the second processor 2 is effected, the read/write pointer 36 is advanced by one position, so that one item of data is imparted from the first partial queue 11 to the second partial queue 12. As a result, the first partial queue 11 becomes short, while the second partial queue 12 becomes long. In addition, the length of the coupled queue 13 is the sum of the length of the first partial queue 11 and the length of the second partial queue 12, and becomes short each time the read pointer 35 is advanced.

It should be noted that when the read/write pointer 36 indicates the same position as that of the write pointer 34, the first partial queue 11 is empty. Meanwhile, when both the read/write pointer 36 and the read pointer 35 indicate the same position as that of the write pointer 34, both the first partial queue 11 and the second partial queue 12 are empty. In addition, when both the read/write pointer 36 and the read pointer 35 indicate a position immediately preceding the write pointer 34, the first partial queue 11 is full and the second partial queue 12 is empty.

Figure 2C:
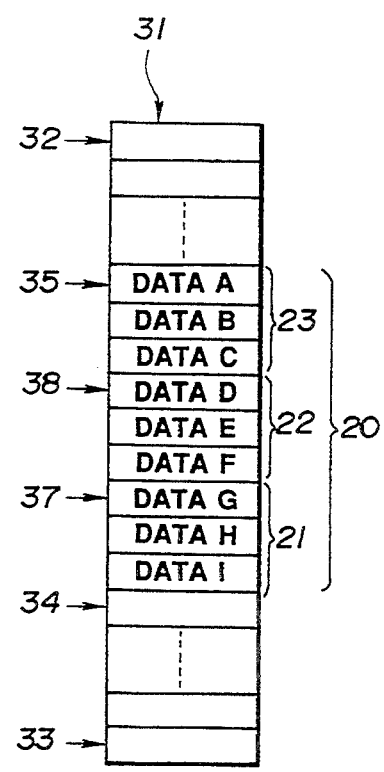

FIG. 2(c) shows a table for forming the coupled queue 20 shown in FIG. 1(c). In this table, a first read/write pointer 37 and a second read/write pointer 38 are provided in the table shown in FIG. 2(a). It should be noted that, in FIG. 2(c), those positions that function in the same way as those in FIG. 2(a) are denoted by the same reference numerals for the sake of convenience.

Here, the write pointer 34 and the read pointer 35 indicate the respective positions where the reading and writing of data by the first processor 1 are effected. The write pointer 34 and the read pointer 35 are respectively advanced by one position each time the reading and writing of data are effected.

In addition, the first read/write pointer 37 indicates the position where the reading and writing of data by the first task 2-1 in the second processor 2 are effected. When the data is read from this position, the first read/write pointer 37 is advanced by one position, and at this time the updating of data by writing can also be effected. Furthermore, the second read/write pointer 38 indicates the position where the reading and writing of data by the second task 2-2 in the second processor 2 are effected. Each time data is read, the second read/write pointer 38 is advanced by one position, and the updating of data can also be effected concurrently. It goes without saying that the first read/write pointer 37 does not outstrip the write pointer 34, the second read/write pointer 38 does not outstrip the first read/write pointer 37, and the read pointer 35 does not outstrip the second read/write pointer 38.

An area ranging from a position immediately following the write pointer 34 to the first read/write pointer 37 corresponds to the first partial queue 21, an area ranging from a position immediately following the first read/write pointer 37 to the second read/write pointer 38 corresponds to the second partial queue 22, and an area ranging from a position immediately following the second read/write pointer 38 to the read pointer 35 corresponds to the third partial queue 23.

The coupled queue 20 is formed by coupling the first partial queue 21, the second partial queue 22, and the third partial queue 23. Meanwhile, the first read/write pointer 37 also serves as the data-reading position (read pointer) located on the rear side of the first partial queue 21 as well as the data-writing position (write pointer) located on the forward side of the second partial queue 22. Furthermore, the second read/write pointer 38 also serves as the data-reading position (read pointer) located on the rear side of the second partial queue 22 as well as the data-writing position (write pointer) located on the forward side of the third partial queue 23.

Here, if the reading of data by the first task 2-1 in the second processor 2 is effected, the first read/write pointer 37 is advanced by one position, so that one item of data is imparted from the first partial queue 21 to the second partial queue 22. In addition, if the reading of data by the second task 2-2 in the second processor 2 is effected, the second read/write pointer 38 is advanced by one position, so that one item of data is imparted from the second partial queue 22 to the third partial queue 23.

It should be noted that when all of the first read/write pointer 37, the second read/write pointer 38, and the read pointer 35 indicate the same position as that of the write pointer 34, all of the first partial queue 21, the second partial queue 22, and the third partial queue 23 are empty. In addition, when all of the first read/write pointer 37, the second read/write pointer 38, and the read pointer 35 indicate a position immediately preceding the write pointer 34, the first partial queue 21 is full, and both the second partial queue 22 and the third partial queue 23 are empty.

Figure 3:
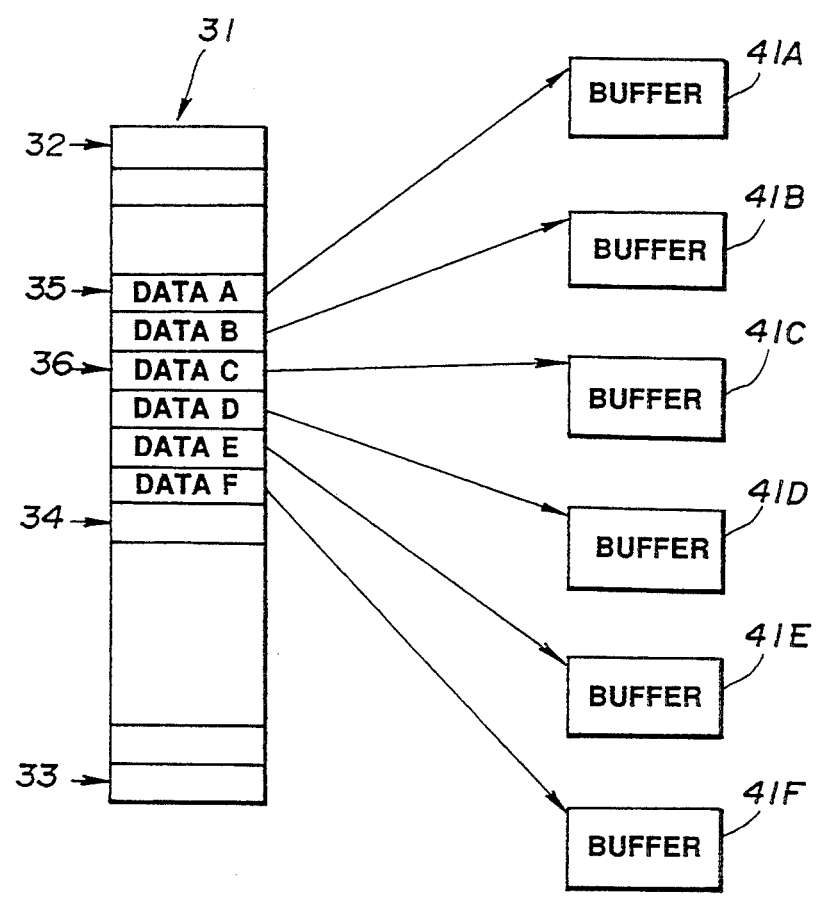
FIG. 3 is a diagram used for illustrating the exchange of messages between two processors which is effected by using the coupled queues shown in FIG. 2.

Referring now to FIG. 3, a description will be given of the operation at a time when messages in buffers are exchanged between the first and second processors 1, 2 shown in FIG. 1(b), by making use of the coupled queue 13 shown in FIG. 2(b).

First, at a time when the first processor 1 writes data A, B . . . , F into the queue area 31 located in the common memory 3 and forms the coupled queue 13 by writing in accordance with the write pointer 34, the first processor 1 writes addresses of buffers 41A, 41B, 41C, 41D, 41E, 41F located in the common memory 3 as the data A, B, C, D, E, F. Then, the first processor 1 generates an interruption to the second processor 2. The first processor 1 writes in advance respective messages to be transmitted to the second processor 2 into the respective buffers.

In response to the interruption from the first processor 1, the second processor 2 reads the data A from the position of the read/write pointer 36 of the coupled queue 13, accesses the buffer 41A on the basis of this data A, i.e., the address of the buffer 41A, and reads the message from this buffer. When the message from the first processor 1 is thus read from the buffer 41A, the second processor 2 writes a response message concerning that message into the buffer 41A, and updates the content stored in the buffer 41A. At this juncture, the read/write pointer 36 is advanced by one position and indicates the position of the data B, while the read pointer 35 indicates the position of the data A. Accordingly, the first partial queue 11 is constituted by the data B, C, D, E, F, while the second partial queue 12 is constituted by the data A.

Subsequently, the second processor 2 reads the data B from the position of the read/write pointer 36, accesses the buffer 41B on the basis of the data B, i.e., the address of the buffer 41B, and reads the message from this buffer. At the same time, the second processor 2 writes a response message into that buffer, thereby updating the stored content. At this juncture, the read/write pointer 36 is advanced by one position and indicates the position of the data C, while the read pointer 35 indicates the position of the data A. Accordingly, the first partial queue 11 is constituted by the data C, D, E, F, while the second partial queue 12 is constituted by the data A, B.

Likewise thereafter, the second processor 2 sequentially reads the data C, D, E, F in accordance with the read/write pointer 36, sequentially accesses the buffers 41C, 41D, 41E, 41F on the basis of these data, i.e., the respective addresses, and sequentially reads respective messages from these buffers. At the same time, the second processor 2 sequentially writes response messages in the respective buffers. In consequence, the read/write pointer 36 is advanced sequentially, and reaches the same position as that of the write pointer 34. At this time, the second processor 2 completes the reading of data from the coupled queue 13.

Meanwhile, each time the read/write pointer 36 is advanced, the sequential reading of data in accordance with the read pointer 35 becomes possible. Hence, the first processor 1 is subjected to an interruption from the second processor 2, and sequentially reads the data A, B, . . . from the second partial queue 12 in accordance with the read pointer 35 in response to that interruption.

Then, the first processor 1 sequentially accesses the buffers 41A, 41B : . . on the basis of the data A, B, . . . , i.e., the respective addresses, and sequentially reads response messages from these buffers.

That is, if the addresses of the buffers 41A, 41B, . . . are set as the data A, B . . . to be written into the coupled queue 13, it is possible to sequentially transmit the messages written in the buffers by the first processor 1 to the second processor 2, and to sequentially return response messages written in the buffers by the second processor 2 to the first processor 1. Moreover, this exchange of messages is executed by carrying out an interruption from the first processor 1 to the second processor 2 and an interruption from the second processor 2 to the first processor 1 only once, respectively, and the addresses written in the coupled queue 13 need not be updated at the time of the exchange of the messages.

In addition, also in the case of the coupled queue 20 comprising three partial queues, such as the one shown in FIG. 2(c), the first processor 1 is capable of writing the addresses of the buffers as the respective data. In this case, when the first task 2-1 in the second processor 2 reads one address from the first read/write pointer 37 in response to an interruption from the first processor 1, the second processor 2 reads a message by accessing the buffer on the basis of that address, and forms a first response message by processing that message. Then, the first task 2-1 writes the first response message into that buffer, and generates an interruption to the second task 2-2. The second task 2-2 reads the address of that buffer from the second read/write pointer 38 in response to the interruption from the first task 2-1, and reads the first response message by accessing that buffer. Then, the second task 2-2 forms a second response message by processing the first response message, writes this second response message into that buffer, and generates an interruption to the first processor 1. Finally, the first processor 1 reads the address of the buffer from the read pointer 35 in response to that interruption, and reads the second response message by accessing this buffer. If addresses of a plurality of buffers are sequentially written into the coupled queue 20, such a series of processing is effected sequentially for each address by effecting an interruption from the first processor 1 to the first task 2-1 in the second processor 2 only once. Accordingly, the first processor 1 is capable of consecutively obtaining the second response messages subjected to a series of processing, by sequentially writing into the coupled queue 20 the address of the buffer into which a message has been written. Hence, the processing by the first and second tasks 2-1, 2-2 in the second processor 2 can be regarded as a pipeline. Processing as .such a pipeline is not restricted to a series of tasks in the second processor, and may be adopted for a series of processors such as the second processor, the third processor, . . . .

Figure 9:
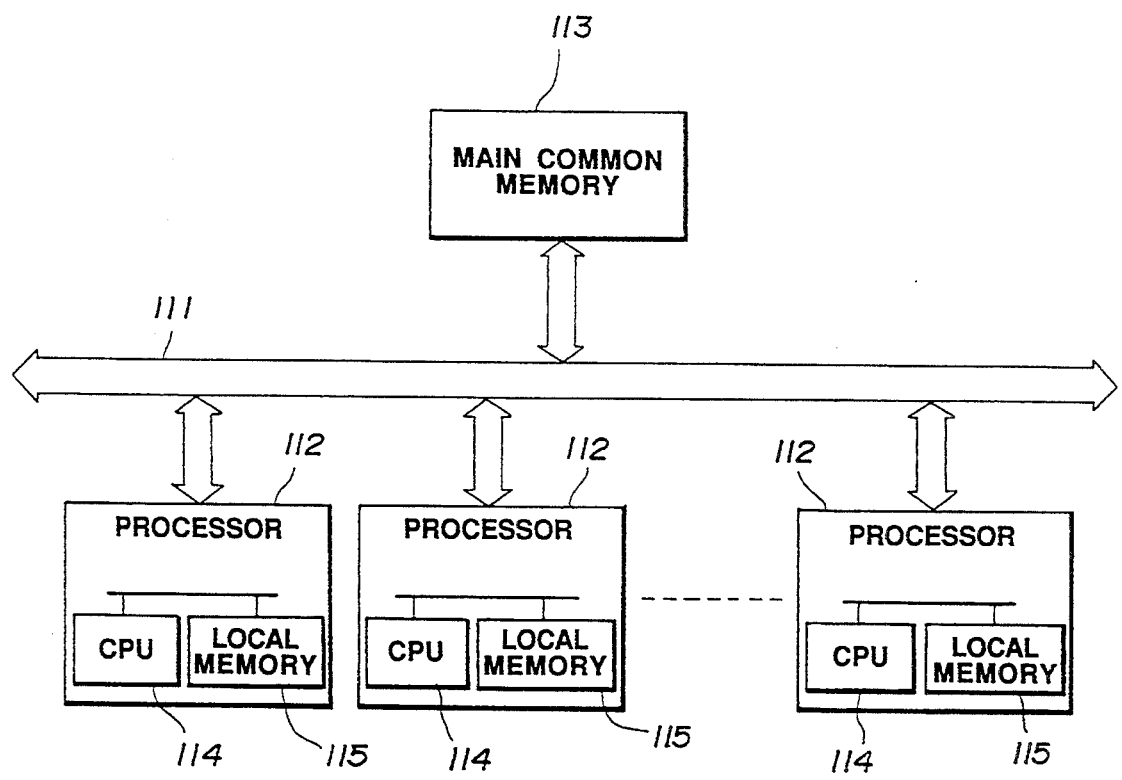
FIG. 9 is a block diagram schematically illustrating an example of the multiprocessor system.
Figure 10:
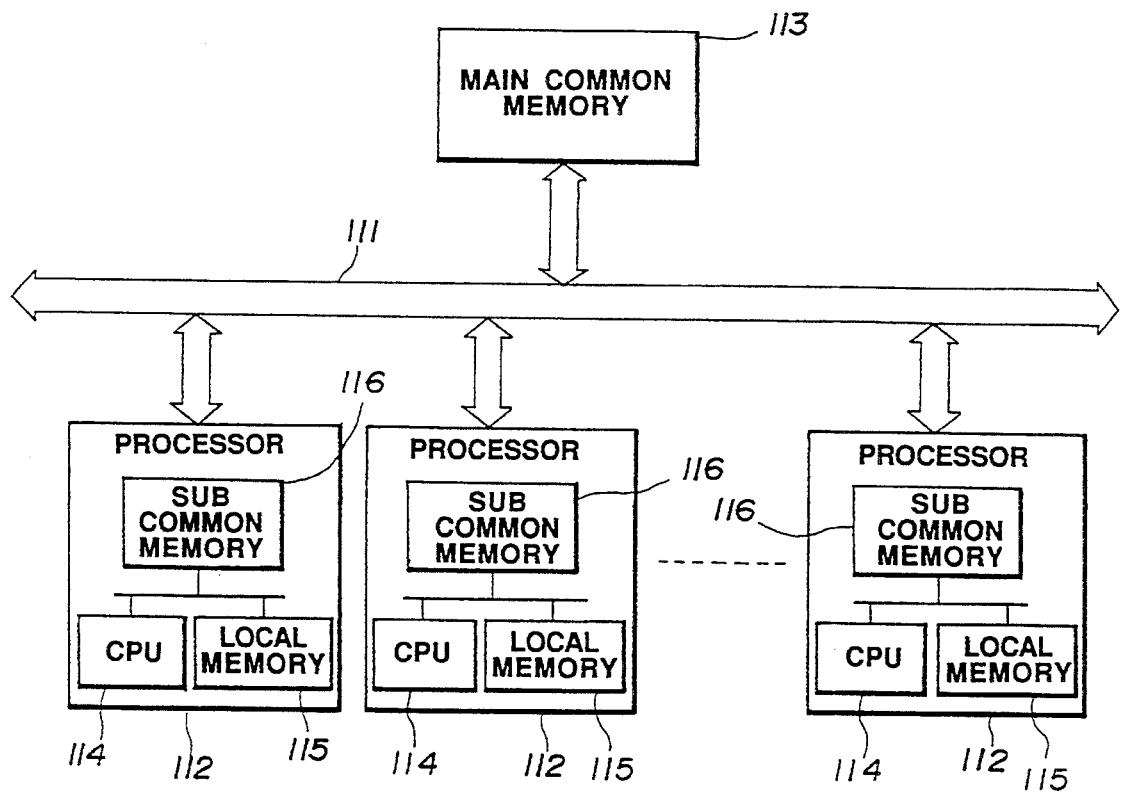
FIG. 10 is a block diagram schematically illustrating another example of the multiprocessor system.
Figure 11:
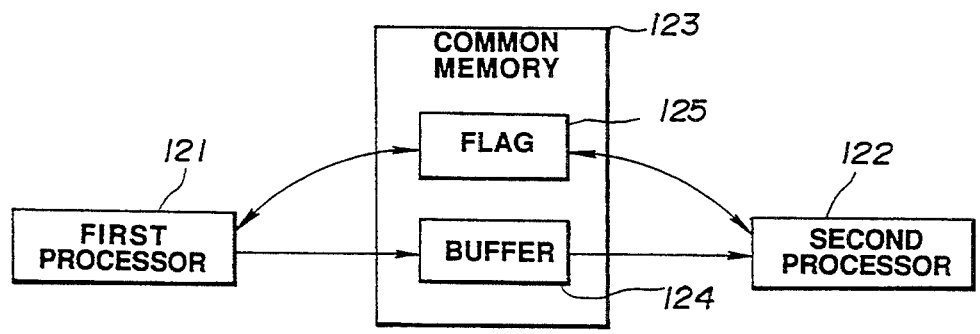
FIG. 11 is a diagram illustrating a conventional method of communication in the multiprocessor system.

It goes without saying that the queues shown in FIGS. 2(a) to 2(c) and the buffers shown in FIG. 3 are formed in a main common memory 113 in the case of a multiprocessor system shown in FIG. 9, and are formed in the main common memory 113 or sub common memories 116 in the case of a multiprocessor system shown in FIG. 10.

In a case where various data communications are effected among a multiplicity of processors, it is necessary to form queues for each data communication, and if the number of types of data communication becomes enormously large, the number of queues also becomes enormously large. For instance, there are cases where numerous coupled queues are required, including a coupled queue for conducting data communication between the first and second processors, a coupled queue for conducting data communication among the third, fourth, and fifth processors, and a coupled queue for conducting data communication between the first and fifth processors. For this reason, a plurality of queues are managed in the multiprocessor system in accordance with the present invention.

FIG. 4 shows the structure of a queue management table for managing queues. This queue management table is provided to, for instance, each processor 112 shown in FIG. 10, and these processors 112 store their own queue management tables in their sub common memories 116, respectively. In this queue management table, one processor 112 is capable of registering respective management data with respect to a plurality of queues which it possesses in its own sub common memory 116.

Appellations #1 - #n allotted to the plurality of queues are registered in this queue management table. If, for instance, a queue #1 among these queues is a coupled queue, the following are registered as the management data for the queue #1: the number of couplings of the queue m1, i.e., the number of partial queues; a plurality of receivers' identifiers $S_1$ - $S_{m1}$, i.e., identifiers indicating receivers (processors or tasks in the processors, etc.) for reading data from the read pointer and a plurality of read/write pointers; a coupled queue start address and a coupled queue end address, i.e., the position of the coupled queue in the common memory; a write pointer of the coupled queue; and a plurality of read/write pointers $R_1$ - $R_{m1-1}$ and a read pointer $R_{m1}$ which correspond to the identifiers. If it is now assumed that the queue #1 is a coupled queue constituted by three partial queues, as shown in FIG. 2(c), the following are registered as the management data for the queue #1: the number of couplings of the queue m1=3; three receivers' identifiers $S_1$ - $S_3$; the position of the coupled queue in the common memory; a write pointer; and two read/write pointers $R_1$, $R_2$ and a read pointer $R_3$ ($R_3 = R_{m1}$) indicating the positions from which the three receivers read data, respectively. The receivers' identifiers, however, are registered when desired by the receivers, as will be described later.

It should be noted that if, for instance, a queue #2 is a queue having only one read pointer, as shown in FIG. 2(a), the following are registered as the management data for the queue #2: the number of couplings of the queue m2=1; one identifiers $S_1$; the position of the queue in the common memory; a write pointer; and a read pointer $R_1$ ($R_1 = R_{m2}$, no read/write pointer) indicating the position from which one receiver reads data.

If queue management tables for the respective processors are thus formed in the sub common memories 116 shown in FIG. 10, unless the queue management tables are made accessible from any of the processors, it is impossible to fully utilize the multiplicity of queues managed on the basis of the queue management tables. Accordingly, a pointer table, such as the one shown in FIG. 5, in which the positions of the queue management tables are registered are formed in the main common memory 113 shown in FIG. 10.

Registered in this pointer table are the appellations #P1 - #Pn allotted to the respective processors 112; respective pointers indicating the positions of the queue management tables possessed by the processors #P1 - #Pn; and the number of queues managed on the basis of each of the queue management tables. It should be noted that since the change of the content of the pointer table need not be effected frequently if predetermined information is written once during initialization, it suffices if one processor playing a leading role in the system effects initialization once in advance of the other processors.

If the pointer table shown in FIG. 5 is thus formed in the main common memory 113 shown in FIG. 10, and the queue management tables shown in FIG. 4 are formed in the sub common memories 116 of the processors 112 shown in FIG. 10, the processors 112 are capable of accessing the queue management tables possessed by the other processors on the basis of the pointer table by accessing the pointer table in the main common memory 113, and are further capable of accessing desired queues on the basis of the queue management tables. That is, the processors 112 are capable of accessing all the queues in the system, whereby it is possible to utilize the multiplicity of queues.

Now, if communication is effected by making use of the multiplicity of queues in a multiprocessor, it is necessary to carry out the communication by referring to the queue management table shown in FIG. 4 and the pointer table shown in FIG. 5. A description will be given hereinunder of operation which is carried out for this purpose.

First, a description will be given of the operation at a time when data is read from a specific queue in accordance with a flowchart shown in FIG. 6.

At a time when, for instance, the first task 2-1 in the second processor 2 shown in FIG. 1(c) is executing processing, if a data-reading instruction for reading data from a queue possessed by the first processor 1 is generated, the second processor 2 first accesses the pointer table shown in FIG. 5.

Upon accessing the pointer table, the second processor 2 determines whether or not the first processor 1 indicated by the queue identifier given as a result of the reading instruction is registered in the pointer table (Step 101). However, this queue identifier indicates not only a specific processor but also a specific queue possessed by the processor and a specific read/write pointer in that queue.

Here, if there has been no registration of the first processor corresponding to the queue identifier (Step 102, NO), this processing is ended (Step 103). On the other hand, if there has been registration of the first processor 1 corresponding to this queue identifier (Step 102, YES), the second processor 2 reads the pointer of the queue management table of the first processor 1 from the pointer table, and accesses the queue management table of the first processor 1 on the basis of this pointer (Step 104).

When the queue management table shown in FIG. 4 is accessed as the queue management table of the first processor 1, and if it is assumed that the queue identifier indicates the first processor 1 as well as the queue #1 and the read/write pointer $R_1$, the second processor 2 refers to the queue start address and end address of the queue #1 and the read/write pointer $R_1$ in the queue management table, and accesses queue #1 on the basis of them.

If it is now assumed that the queue #1 is the coupled queue 20 shown in FIG. 2 (c) and that the read/write pointer $R_1$ is the first read/write pointer 37, the second processor 2 determines whether or not the first partial queue 21 in the coupled queue 20 is empty on the basis of whether or not the first read/write pointer 37 coincides with the write pointer 34 (Step 105). If the first read/write pointer 37 coincides with the write pointer 34, and the first partial queue 21 is hence empty (Step 105, YES), this processing is ended (Step 106).

On the other hand, if the first read/write pointer 37 does not coincide with the write pointer 34, and the first partial queue 21 is hence not empty (Step 105, NO), the first task 2-1 in the second processor 2 reads data from the first read/write pointer 37 (Step 107). At this juncture, the read/write pointer $R_1$ in the queue management table is advanced by one position and is thereby updated.

Furthermore, if the updated read/write pointer $R_1$ does not coincide with the write pointer, i.e., if the first read/write pointer 37 does not reach the write pointer 34, the reading of data from the first partial queue 21 is continued. Reading is continued in this manner until the first read/write pointer 37 and the write pointer 34 coincide with each other, and when the two pointers coincide with each other, reading is ended.

When the reading of data from the first partial queue 21 is thus ended, the second processor 2 determines whether or not the receiver's identifier $S_2$ corresponding to the read/write pointer $R_2$ following the read/write pointer $R_1$ (the first read/write pointer 37) in the queue management table is registered in the first processor's queue management table (Step 108). If the receiver's identifier $S_2$ has not been registered (Step 108, NO), the access from the first task 2-1 in the second processor 2 to the queue #1 is ended (Step 109). Meanwhile, if the receiver's identifier $S_2$ has been registered (Step 108, YES), the second processor 2 determines on the basis of the receiver's identifier $S_2$ a processor which is waiting for reading data from the read/write pointer $R_2$ as well as a kind of interruption to that processor, and effects an interruption of said kind to that processor (Step 110). If the second processor 2 has been registered as the processor waiting for reading data from the read/write pointer $R_2$ (the second read/write pointer 38), and an interruption to the second task 2-2 has been registered as the receiver's identifier $S_2$ in terms of the kind of interruption, the second processor 2 generates an interruption to the second task 2-2. Subsequently, the first task 2-1 in the second processor 2 proceeds to Step 109 to end processing.

Figure 6:
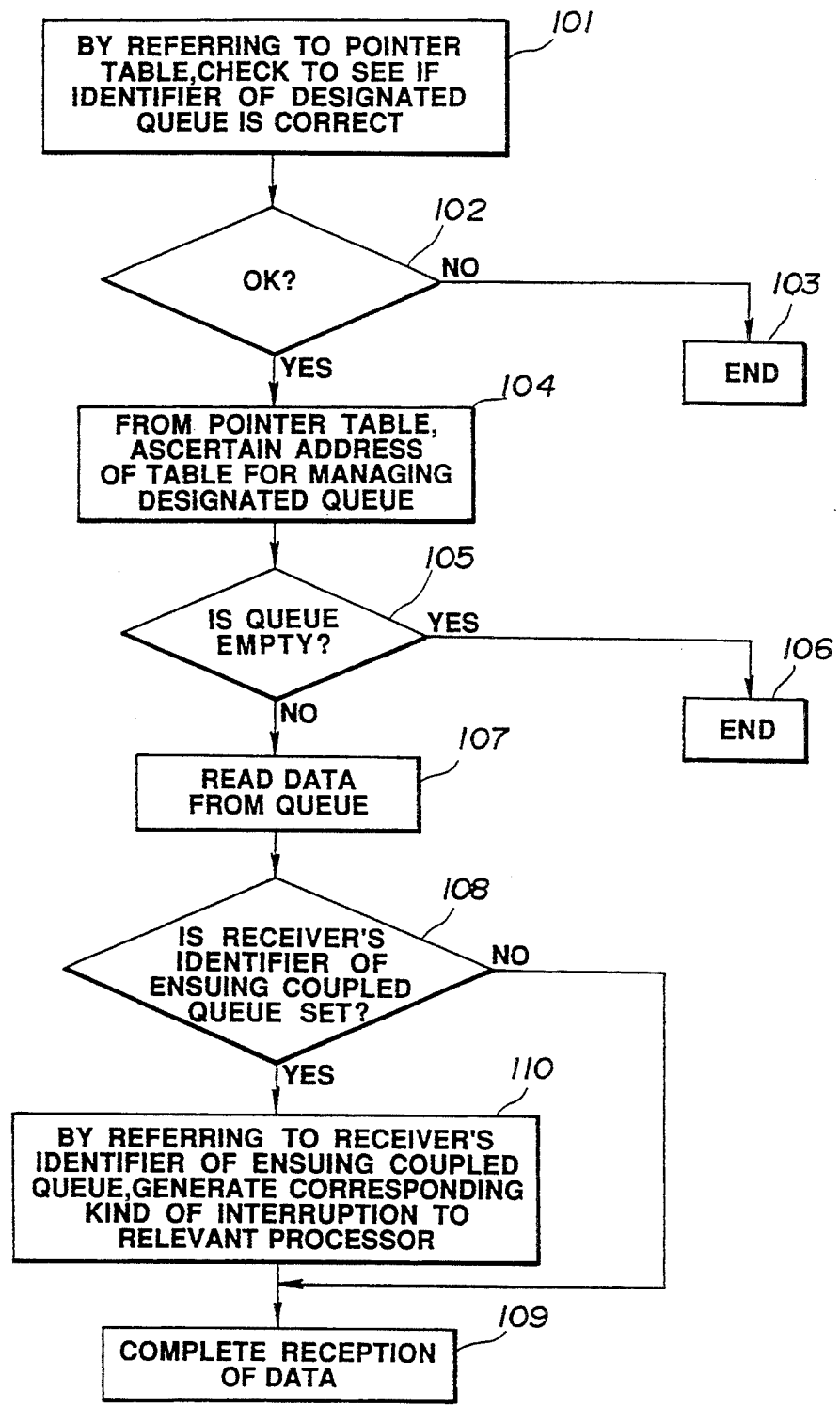
FIG. 6 is a flowchart illustrating an example of the operation of reading from a coupled queue in accordance with the embodiment.

Such processing with the flowchart shown in FIG. 6 makes it possible for the task of the processor to access a queue during execution of a program and to immediately obtain data from that queue, and can be carried out without entailing an interruption to the task of the processor.

It should be noted that the receiver's identifier in the queue management table contains information indicating a processor to which the receiver (task) belongs and the kind of interruption for generating an interruption to that receiver. That is, the receiver's identifier uniformly determines what kind of interruption is to be generated to which processor. For this reason, it is necessary to prepare kinds of interruptions corresponding to the number of receivers in one processor, but the kinds of interruptions may be prepared by being distinguished by hardware. Alternatively, an arrangement may be provided such that flags for discriminating the kinds of interruptions are set in advance in the common memory in a number corresponding to the number of kinds of interruptions, and interruptions are made discriminable through a combination of these flags and an interruption by one kind of hardware. In the case where flags are used as in the latter case, the interrupting side generates an interruption by hardware after first setting the flag, while the side subject to interruption discriminates the kind of interruption by referring to that flag through an interrupt processing routine set in advance, so that an interruption will be generated to the receiving side corresponding to that kind. However, if a plurality of flags have been set, processing is effected under the assumption that a plurality of interruptions have been generated.

Referring now to a flowchart shown in FIG. 7, a description will be given of processing at a time when a queue is accessed as a result of the generation of an interruption.

At a time when, for instance, the second task 2-2 in the second processor 2 shown in FIG. 1(c) is executing processing, if a data-reading instruction for reading data from the queue possessed by the first processor 1 is generated, the second processor 2 first accesses the pointer table shown in FIG. 5 so as to determine whether or not the first processor 1 indicated by the queue identifier given as a result of the read instruction is registered in the pointer table (Step 201). Here, if there has been no registration of the first processor 1 corresponding to that queue identifier (Step 202, NO), processing is ended (Step 203). On the other hand, if there has been registration of the first processor 1 corresponding to that queue identifier (Step 202, YES), the second processor 2 reads the pointer of the queue management table of the first processor 1 from the pointer table, and accesses the queue management table of the first processor 1 on the basis of the pointer (Step 204). It should be noted that if, at the time of the above-described processing concerning the first task 2-1, the second processor 2 has stored the pointer of the queue management table of the first processor 1 already retrieved, the pointer of the queue management table of the first processor 1 is not updated, so that Steps 201, 202 can be omitted.

If the queue management table shown in FIG. 4 is accessed as the queue management table of the first processor 1, and the queue identifier indicates not only the first processor 1 but also the queue #1 and the read/write pointer $R_2$, the second processor 2 refers to the start address and end address of the queue #1 as well as the read/write pointer $R_2$ and the like in the queue management table, and accesses the queue #1 on the basis of them.

If it is now assumed that the queue #1 is the coupled queue 20 having the structure shown in FIG. 2(c) and that the read/write pointer $R_2$ is the second read/write pointer 38, the second processor 2 determines whether or not the second partial queue 22 in the coupled queue 20 is empty on the basis of whether or not the second read/write pointer 38 coincides with the first read/write pointer 37 (Step 205). If a determination is made that the second partial queue 22 is not empty (Step 205, NO), the second task 2-2 in the second processor 2 reads data from the second read/write pointer 38 until the second read/write pointer 38 reaches the first read/write pointer 37 (Step 206).

On the other hand, if it is determined in Step 205 that the second partial queue 22 is empty (Step 205, YES), the second task 2-2 in the second processor 2 registers the identifier of the second task 2-2 in the second processor 2 as the receiver's identifier $S_2$ corresponding to the read/write pointer $R_2$ of the queue #1 in the queue management table of the first processor 1, and waits until an interruption occurs (Step 207).

It follows, therefore, that, in this processing, if the accessed queue is empty, one's own identifier is registered in the counterpart's queue management table, and the operation waits until an interruption occurs subsequently.

If it is now assumed that, for instance, the first task 2-1 in the second processor 2 has accessed the queue #1 and read data from the first read/write pointer 37, since the first read/write pointer 37 is advanced by one position, the first partial queue 21 ranging from a position immediately following the write pointer 34 to the first read/write pointer 37 ceases to be empty. Then, upon completion of the reading of data by the first task 2-1, the second processor 2 determines whether or not the receiver's identifier $S_2$ corresponding to the second read/write pointer 38 (read/write pointer $R_2$) is registered in the queue management table. Here, since the identifier of the second task 2-2 has been registered in advance as the receiver's identifier $S_2$, the second processor 2 generates an interruption of the kind corresponding to that identifier within the second processor 2, whereby an interruption to the second task 2-2 is effected.

The second processor 2 receives that interruption in an interrupt processing routine (Step 301), generates an interruption to the second task 2-2 in correspondence with the kind of that interruption (Step 302), and ends interrupt processing (Step 303).

Although the second task 2-2 was waiting after registering the identifier of the second task 2-2 as the receiver's identifier $S_2$, the second task 2-2, upon receiving the aforementioned interruption, deletes the identifier from the queue management table (Step 208).

Then, the second task 2-2 in the second processor 2 accesses the queue #1 again, and reads data from the second read/write pointer 38 until the second partial queue 22 becomes empty (Step 206).

When the reading of data from the second partial queue 22 is thus ended, the second processor 2 determines whether or not the receiver's identifier corresponding to another read/write pointer following the second read/write pointer 38 is registered in the queue management table (Step 209). If it has not been registered (Step 209, NO), the second processor 2 ends the access to the queue #1 by the second task 2-2 (Step 210). On the other hand, if the receiver's identifier has been registered (Step 209, YES), the second processor 2 generates an interruption corresponding to that identifier (Step 211), and ends this processing (Step 210).

It should be noted that the identifier of the first processor 1 having the read pointer 35 shown in of FIG. 2(c) can be registered in the queue management table as the receiver's identifier corresponding to another read/write pointer following the second read/write pointer 38. In this case, the first processor 1 registers its one's identifier in the queue management table as the receiver's identifier corresponding to the read pointer 35, and then the first processor 1 waits for an interruption from the second processor 2. Upon receiving the interruption, the first processor 1 reads data from the read pointer 35 until the third partial queue 23 becomes empty.

Figure 7:
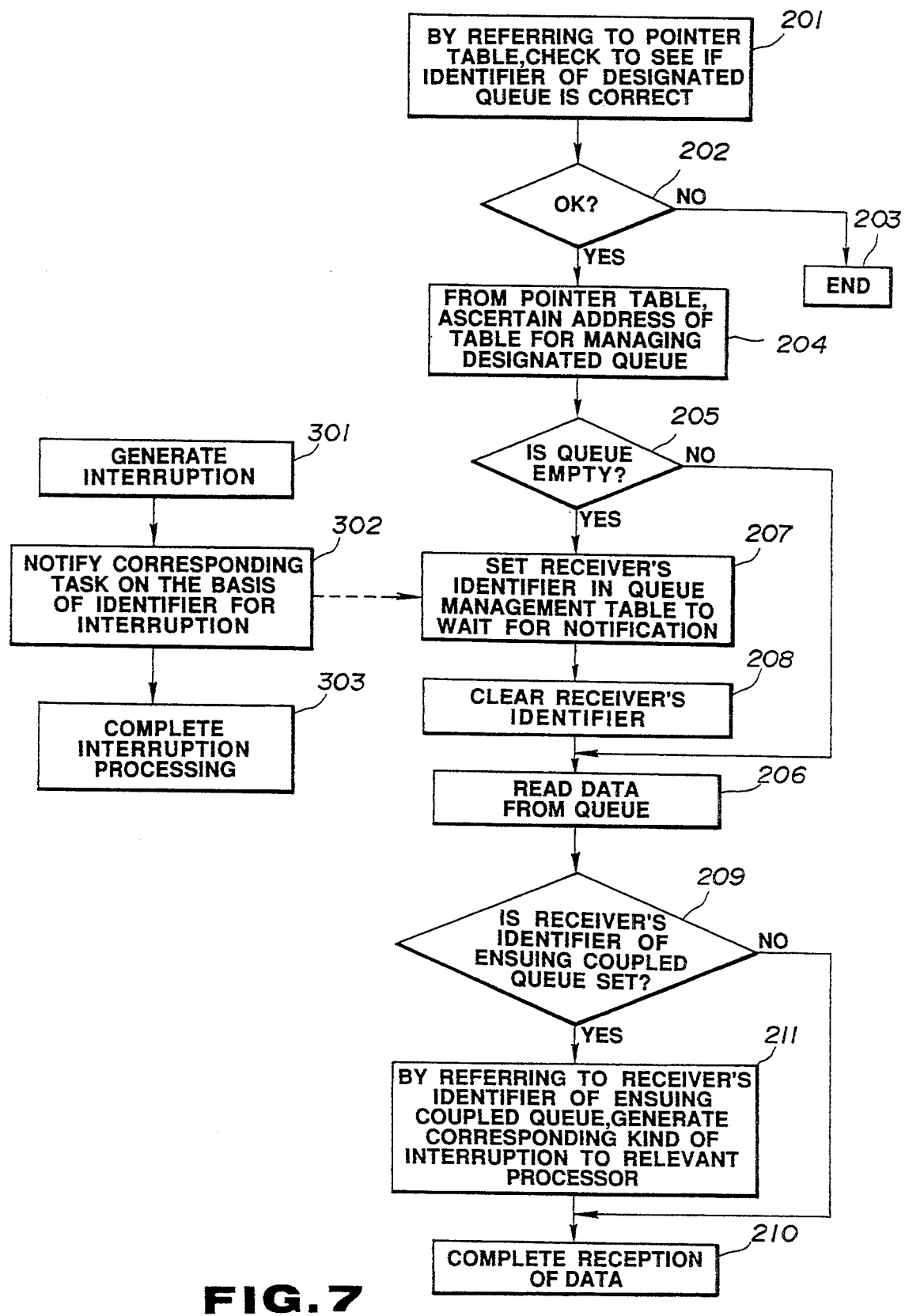
FIG. 7 is a flowchart illustrating another example of the operation of reading from a coupled queue in accordance with the embodiment.

Even if the task of the processor is not able to obtain data from the queue, such processing with the flowchart shown in FIG. 7 makes it possible to obtain data from the queue if the identifier of the task of the processor is registered in the queue management table and the operation waits for an interruption.

Referring now to a flowchart shown in FIG. 8, a description will be given of the operation at a time when data is written.

At a time when, for instance, the first processor 1 shown in FIG. 1(c) is executing processing, if a write instruction to the queue possessed by a specific processor is generated, the first processor 1 first accesses the pointer table shown in FIG. 5, and determines whether a specific processor indicated by the queue identifier given as a result of the aforementioned read instruction is registered in the pointer table (Step 401). If there has been no registration of a specific processor corresponding to that queue identifier (Step 402, NO), processing is ended (Step 403). On the other hand, if there has been registration of the specific processor corresponding to the queue identifier (Step 402, YES), the first processor 1 reads the pointer of the queue management table of the specific processor from the pointer table, and accesses the queue management table of the specific processor on the basis of that pointer (Step 404). It should be noted that in a case where the first processor 1 accesses its own queue, there is no need to retrieve the pointer of its own queue management table, so that Steps 401, 402 may be omitted.

If it is assumed that the first processor 1 has accessed its own queue management table, that this queue management table is the queue management table shown in FIG. 4, and that the queue identifier indicates the queue #1 and the write pointer, then the first processor 1 refers to the start address and end address of the queue #1 as well as the write pointer and the like in the queue management table, and accesses the queue #1 on the basis of them.

If it is now assumed that the queue #1 is the coupled queue 20 such as the one shown in FIG. 2(c) and that the queue identifier indicates the write pointer 34, the first processor 1 determines whether or not the coupled queue 20 is full on the basis of whether or not the read pointer 35 is located at a position immediately preceding the write pointer 34 (Step 405). If the coupled queue 20 is full (Step 405, YES), it is impossible to write data into the coupled queue 20, so that this processing is ended (Step 406). On the other hand, if the coupled queue 20 is not full (Step 405, NO), the first processor 1 writes data into the write pointer 34 (Step 407). At this time, the write pointer in the queue management table is advanced by one position and is thereby updated.

Furthermore, if the updated write pointer fails to coincide with the position immediately preceding the read pointer $R_{m1}$, i.e., if the write pointer 34 has not reached the position immediately preceding the read pointer 35, the first processor 1 can continue to write data in accordance with the write pointer 34.

Upon completion of the writing of data into the coupled queue 20 in the above-described manner, the first processor 1 determines whether or not the receiver's identifier $S_1$ corresponding to the read/write pointer $R_1$ following the write pointer 34 is registered in the queue management table (Step 408). If there has been no registration (Step 408, NO), the access to the queue #1 is ended (Step 410). On the other hand, if the identifier of the first task in the second processor 2 is registered as the receiver's identifier $S_1$ (Step 408, YES), the first processor 1 Generates an interruption to the first task 2-1 in the second processor 2 on the basis of that identifier (Step 409), and ends this processing (Step 410).

It should be noted that it is possible to effect writing not only into the write pointer 34 but also into the read/write pointer. For instance, the first task 2-1 in the second processor 2 accesses the queue management table of the first processor 1, determines the first read/write pointer 37 of the queue #1, and effects writing by updating data in conjunction with the reading of the data from the first read/write pointer 37. In this case, the data is written into the second partial queue 22, but it is possible to sequentially write data until the first read/write pointer 37 reaches the write pointer 34. When the first read/write pointer 37 and the write pointer 34 coincide with each other, it is determined that the second partial queue 22 is full, so that the writing into the second partial queue 22 is not possible. Similarly, the second task 2-2 in the second processor 2 determines the second read/write pointer 38 of the queue #1, and updates data in conjunction with reading from the second read/write pointer 38 until the second read/write pointer 38 reaches the first read/write pointer 37, so that the second task 2-2 is capable of writing data.

Figure 8:
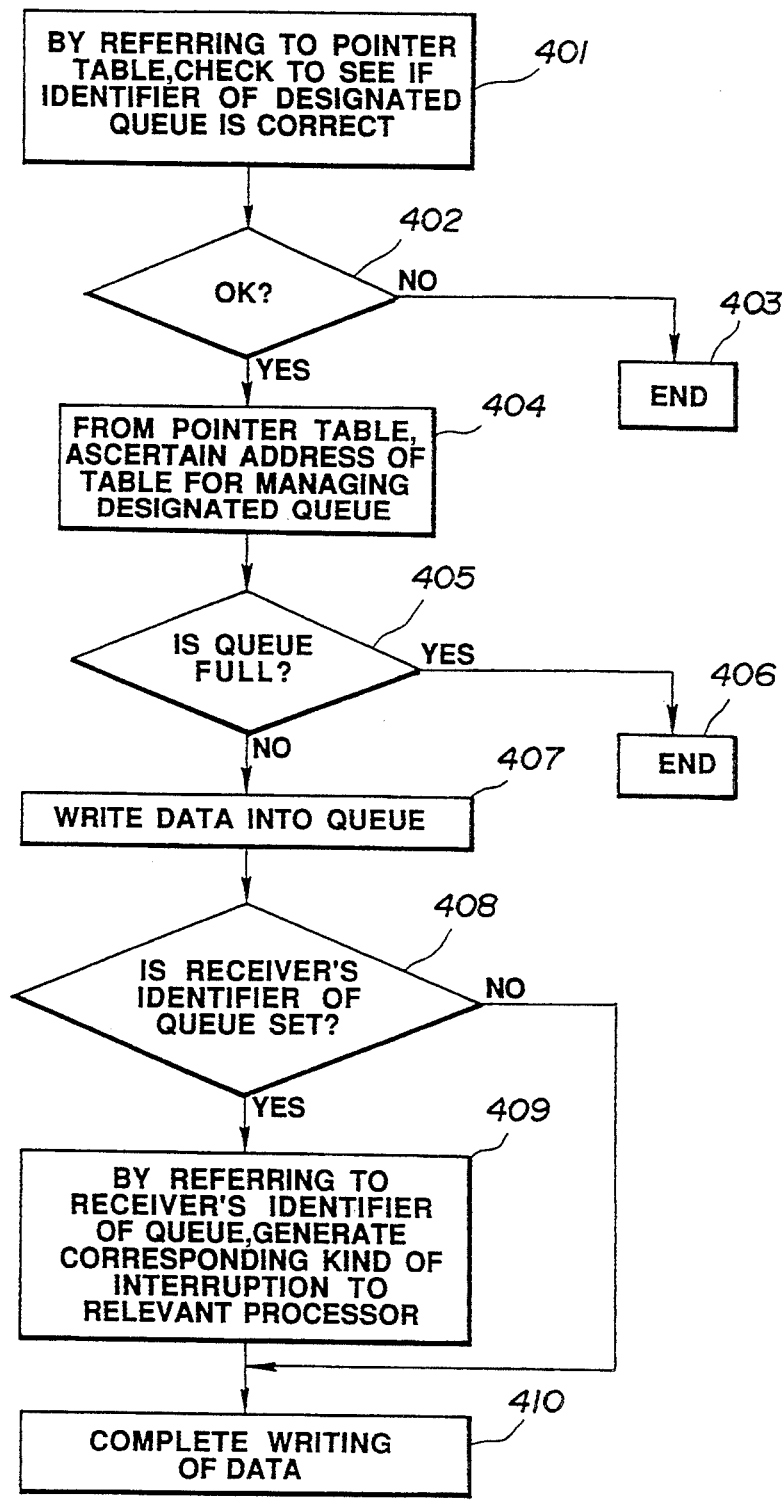
FIG. 8 is a flowchart illustrating an example of the operation of writing into the coupled queue in accordance with the embodiment.

Such processing with the flowchart shown in FIG. 8 allows a processor to access a queue during execution of a program, and write data in the write pointer or read/write pointer of that queue.

As described above, in this embodiment two-way communication is made possible among a plurality of processors by using a coupled queue in which a plurality of partial queues are coupled, and the queue management table for managing queues containing such coupled queues is formed for each processor, so that any queue is made accessible through a given queue management table. Hence, complicated two-way communication in a multiprocessor system can be conducted efficiently and systematically. The method in accordance with this embodiment is particularly effective in a situation where the number of processors is very large, in a situation where the handling of a multiplicity of kinds of interruptions is difficult due to the restriction of the system bus, and in a situation where various data are transmitted to and received by processors in a complicated manner.

In addition, in a case where communication is conducted between the first processor 1 and the second processor 2 through a coupled queue possessed by the first processor 1, the first processor 1 is capable of ascertaining the state of data processing by the second processor 2 by referring to its own queue management table. for instance, in a case where the first processor 1 has the queue management table shown in FIG. 4, and communication is being conducted between the first processor 1 and the second processor 2 through the queue #1, if the first processor 1 refers to the read/write pointers $R_1$, $R_2$ of the queue #1 in the queue management table, the first processor 1 is capable of ascertaining the state of data processing by the first and second tasks 2-1, 2-2 in the second processor 2.

Furthermore, in the multiprocessor system such as the one shown in FIG. 10, the queue management tables and the queues possessed by the respective processors 112 can be stored in the respective sub common memories 116. Accordingly, at the time of effecting two-way communication among the processors, any one of the processors uses its own sub common memory 116, so that it is possible to access the queue management table and queues from this processor without going through the system bus. In this case, the time duration when the system bus is occupied by that processor is diminished, so that it is possible to enhance the overall efficiency of the system. In addition, since each of the processors independently possesses the plurality of queues, and these queues are managed on the basis of the respective queue management tables in a decentralized manner, the degree of freedom in the system design increases remarkably.

What is claimed is:

1. A multiprocessor system including a first processor, one or a plurality of second processors and a common memory, for exchanging information between the first and second processors through the common memory, the common memory comprising:
   a buffer for storing therein the information to be exchanged between the first and second processors;
   a single queue for storing therein data indicative of an order of exchange of the information stored in the buffer;
   a write pointer for indicating a position of the queue where data corresponding to information to be inserted from the first processor is stored;
   a read pointer for indicating a position of the queue where data corresponding to information to be accessed by the first processor is stored;
   one or a plurality of read/write pointers provided in correspondence with the one or the plurality of second processors, for indicating a position of the queue where data corresponding to information to be accessed by the second processor and also corresponding to information overwritten from the second processor is stored; and
   pointer control means for controlling the write pointer when the first processor inserts the information to be exchanged between the first and second processors into the buffer, for controlling the read pointer when the first processor accesses the information to be exchanged between the first and second processors which is stored in the buffer, and for controlling the read/write pointer when the second processor accesses the information stored in the buffer and to be exchanged between the buffer and the second processors or when the second processor overwrites information to be exchanged into the buffer after accessing the information stored in the buffer, wherein
   the first processor inserts the information to be exchanged into the buffer on the basis of data of the queue indicated by the write pointer and accesses the information stored in the buffer on the basis of data of the queue indicated by the read pointer, and
   the second processor accesses the information to be exchanged and stored in the buffer on the basis of data of the queue indicated by the read/write pointer or overwrites the information to be exchanged into the buffer on the basis of the data of the queue after accessing the information to be exchanged and stored in the buffer based on the data of the queue indicated by the read/write pointer.

2. The multiprocessor system according to claim 1, wherein the queue stores address data indicative of an address of the information stored in the buffer.

3. The multiprocessor system according to claim 1, wherein the second processor includes a plurality of tasks and wherein the read/write pointer comprises a plurality of pointers each corresponding to each of the plurality of tasks.

4. The multiprocessor system according to claim 1, wherein the pointer control means, when the first processor inserts information into the buffer, sequentially moves up one by one the position of the write pointer each time insertion of one information is completed, when the first processor accesses information in the buffer, sequentially moves up one by one the position of the read pointer each time accessing of one information is completed and, when the second processor accesses information in the buffer or when the second processor accesses the information in the buffer and overwrites information into the buffer, sequentially moves up one by one the position of the read/write pointer each time accessing or overwriting of one information is completed.

5. The multiprocessor system according to claim 4, wherein the common memory includes a management table for storing therein the number of couplings of the queue partitioned by the read/write pointer, one or a plurality of receive identifiers for identifying a process which receives information, a queue start address, a queue end address and management information of the write pointer, read pointer and one or the plurality of read/write pointers.

6. The multiprocessor system according to claim 5, wherein the first processor registers into the management table the receiver identifier, the read/write pointer corresponding to the receiver identifier and the queue start address and inserts information into the common memory under control of the write pointer and, when insertion of the information is completed, registers the queue end address into the management table and interrupts the second processor corresponding to the receiver identifier registered in the management table, wherein the second processor, in response to the interrupt, accesses or accesses and overwrites information in the common memory under control the read/write pointer and, when accessing or overwriting is completed, interrupts the first processor, and wherein the first processor accesses information in the common memory under control of the read pointer.

7. The multiprocessor system according to claim 5, wherein the first processor registers into the management table a plurality of receiver identifiers corresponding to the second processors, read/write pointers corresponding to the receiver identifiers and the queue start address and inserts information into the common memory under control the write pointer and, when insertion of the information is completed, registers the queue end address into the management table and interrupts the second processor corresponding to a first receiver identifier registered into the management table, wherein the second processor accesses or accesses and overwrites information in the common memory under control of the read/write pointer and, when accessing or overwriting is completed, interrupts the second processor corresponding to a next receiver identifier in the management table or the first processor, and wherein the first processor accesses information in the common memory under control of the read pointer.

8. The multiprocessor system according to claim 5, wherein the management table manages a plurality of queues.

9. The multiprocessor according to claim 5, wherein the first and second processors judge a current information exchange processing status on the basis of a content of the management table.

10. The multiprocessor according to claim 5, wherein the first processor inserts the information to be exchanged into the buffer under control of the write pointer and the second processors access the information stored in the buffer and to be exchanged under control of the read/write pointer or overwrite information to be exchanged after accessing the information to be exchanged and stored in the buffer and judge whether or not data in the queue partitioned by the read/write pointer is empty and, if the data is empty, interrupt a next processor by referring to the receiver identifier in the management table.

11. The multiprocessor system according to claim 5, wherein the first and second processors access the management table and when accessing the information to be exchanged and which is stored in the buffer, if the information to be exchanged is empty, register into the management table receiver identifies each corresponding to each of the first and second processors which have accessed and wait for the interrupt.

12. A multiprocessor system including a first processor, one or a plurality of second processors and a common memory, each of the first and second processors having a sub common memory, for exchanging information between the first and second processors through the sub common memory, the sub common memory comprising:

a buffer for storing therein the information to be exchanged between the first and second processors;

a single queue for storing therein data indicative of an order of exchange of the information stored in the buffer;

a write pointer for indicating a position of the queue where data corresponding to information to be inserted from the first processor is stored;

a read pointer for indicating a position of the queue where data corresponding to information to be accessed by the first processor is stored;

one or a plurality of read/write pointers provided in correspondence with the one or the plurality of second processors, for indicating a position of the queue where data corresponding to information to be accessed by the second processor and also corresponding to information to be overwritten by the second processor is stored;

pointer control means for controlling the write pointer when the first processor inserts the information to be exchanged between the first and second processors into the buffer, for controlling the read pointer when the first processor accesses the information stored in the buffer and to be exchanged between the first and second processors, and for controlling the read/write pointer when the second processor accesses the information stored in the buffer and to be exchanged between the buffer and the second processor or when the second processor overwrites information to be exchanged after accessing to the buffer; and a management table for storing therein the number of couplings of the queue partitioned by the read/write pointer, a plurality of receive identifiers for identifying a processor which receives the information, a queue start address, a queue end address and management information of the write pointer, the read pointer and the one or the plurality of read/write pointers, wherein the common memory comprises a pointer table for holding a plurality of pointers which indicate storage positions of the management table of the sub common memory and the number of couplings of the queue stored in the management table.

13. The multiprocessor system according to claim 12, wherein the first and second processors judge a current information exchange processing status on the basis of a content of the management table.

14. The multiprocessor according to claim 12, wherein the first processor inserts the information to be exchanged into the buffer under control of the write pointer and the second processor access the information stored in the buffer and to be exchanged under control of the read/write pointer or overwrite information to be exchanged into the buffer after accessing the information stored in the buffer and to be exchanged and judge whether or not data in the queue partitioned by the read/write pointer is empty and, if the data is empty, interrupt a next processor by referring to the receiver identifier in the management table.

15. The multiprocessor system according to claim 12, wherein the first and second processors access the management table and when accessing the information to be exchanged and which is stored in the buffer, if the information to be exchanged is empty, register into the management table receiver identifiers each corresponding to each of the first and second processors which have accessed and wait for the interrupt.

16. The multiprocessor system according to claim 12, wherein the management table manages a plurality of queues.

17. A method of exchanging information in a multiprocessor system including a first processor, one or a plurality of second processors and a common memory, the common memory having a buffer for storing therein information to be exchanged between the first and second processors, a single queue for storing therein data indicative of an order of exchange of the information stored in the buffer, a write pointer for indicating a position of the queue where data corresponding to information to be inserted from the first processor is stored, a read pointer for indicating a position of the queue where data corresponding to information to be accessed by the first processor is stored and a read/write pointer provided in correspondence with the second processors, for indicating a position of the queue where data corresponding to information to be accessed by the second processor and also corresponding to information overwritten from the second processor is stored, wherein exchange of the information is carried out between the first and second processors through the common memory, the method comprising the steps of:

sequentially inserting by the first processor into the buffer corresponding to data indicated by the write pointer and moving up by one the position of the write pointer each time insertion is performed;

interrupting the second processor when the first processor completes insertion of information to be exchanged under control of the write pointer;

sequentially accessing by the second processor being interrupted information stored in the buffer and corresponding to data indicated by the read/write pointer or overwriting after sequentially accessing the information in the buffer and, moving up by one the position of the read/write pointer each time accessing or overwriting is performed;

interrupting the first processor when the second processor completes accessing to the buffer or overwriting information into the buffer under control of the read/write pointer; and sequentially accessing by the first processor being interrupted information stored in the buffer and corresponding to data indicated by the read pointer and moving up by one the position of the read pointer each time accessing is performed.

18. A method of exchanging information in a multiprocessor system including a first processor, a plurality of second processors and a common memory, the common memory having a buffer for storing therein information to be exchanged between the first and second processors, a single queue for storing therein data indicative of an order of exchange of the information stored in the buffer, a write pointer for indicating a position of the queue were data corresponding to information to be inserted from the first processor is stored, a read pointer for indicating a position of the queue where data corresponding to information to be accessed by the first processor is stored, a plurality of read/write pointers provided in correspondence with the second processors, for indicating a position of the queue where data corresponding to information to be accessed by the second processor and also corresponding to information overwritten from the second processor is stored and, a management table for storing management information of a plurality of receiver identifiers indicative of an order of exchange of information and provided in correspondence with the read pointer and the plurality of read/write pointers, wherein exchange of the information is carried out between the first and second processors through the common memory, the method comprising the steps of:

setting by the first processor the plurality of receiver identifiers of the management table;

sequentially inserting information by the first processor into the buffer corresponding to data indicated by the write pointer and moving up by one the position of the write pointer each time insertion is performed;

interrupting the second processor corresponding to a first receiver identifier of the management table when the first processor completes insertion of information to be exchanged into the buffer under control of the write pointer;

sequentially accessing by the second processor being interrupted information stored in the buffer and corresponding to the data indicated by the read/write pointer or overwriting after sequentially accessing the information in the buffer and, moving up by one the position of the read/write pointer each time accessing or overwriting is performed;

interrupting the second processor corresponding to a next receiver identifier of the management table when the second processor completes accessing to the buffer or completes overwriting of information into the buffer under control of the read/write pointer;

interrupting the first processor when the second processor being interrupted corresponds to a receiver identifier immediately before the last receiver identifier; and sequentially accessing by the first processor being interrupted information stored in the buffer and corresponding to data indicated by the read pointer and moving up by one the position of the read pointer each time accessing is performed.

19. A method of exchanging information in a multi-processor system including a first processor, one or a plurality of second processors and a common memory, each of the first and second processors having a sub common memory, the sub common memory having a buffer for storing therein information to be exchanged between the first and second processors, a single queue for storing therein data indicative of an order of exchange of the information stored in the buffer, a write pointer for indicating a position of the queue where data corresponding to information to be inserted from the first processor is stored, a read pointer for indicating a position of the queue where data corresponding to information to be accessed by the first processor is stored, a plurality of read/write pointers provided in correspondence with the one or the plurality of second processors for indicating a position of the queue where data corresponding to information to be accessed by the second processor and also corresponding to information overwritten from the second processor is stored and, a plurality of management tables for storing management information of a plurality of receiver identifiers indicative of an order of exchange of information and provided in correspondence with the read pointer and the plurality of read/write pointers, the common memory including a pointer table having a plurality of pointers for indicating positions where the management tables are stored, wherein exchange of the information is carried out between the first and second processors through the sub common memory, the method comprising the steps of:

accessing by the first processor a desired one of the management tables by referring to the pointer table;

setting by the first processor a plurality of receiver identifiers of the accessed management table;

sequentially inserting information by the first processor into the buffer corresponding to data indicated by the write pointer of the management table and moving up by one the position of the write pointer each time insertion is performed;

interrupting the second processor corresponding to a first receiver identifier of the accessed management table when the first processor completes insertion of information to be exchanged into the buffer under control of the write pointer;

sequentially accessing by the second processor being interrupted information stored in the buffer and corresponding to the data indicated by the read/write pointer of the management table or overwriting after sequentially accessing the information in the buffer and, moving up by one the position of the read/write pointer each time accessing or overwriting is performed;

interrupting the second processor corresponding to a next receiver identifier of the management table when the second processor completes accessing to the buffer or overwriting of information into the buffer under control of the read/write pointer;

interrupting the first processor when the second processor being interrupted corresponds to a receiver identifier immediately before the last receiver identifier; and sequentially accessing by the first processor being interrupted information stored in the buffer and corresponding to data indicated by the read pointer and moving up by one the position of the read pointer each time accessing is performed.

* * * * *